United States Patent
Larivain et al.

(10) Patent No.: US 8,330,287 B2
(45) Date of Patent: Dec. 11, 2012

(54) DEVICE FOR CONVERTING THE RIPPLE AND/OR THE OSCILLATIONS OF A LIQUID IN WHICH IT IS AT LEAST PARTLY IMMERSED, INTO USABLE ENERGY

(76) Inventors: Bruno Larivain, Marseilles (FR); Alexandre Larivain, Puteaux (FR); Olivier Larivain, Puteaux (FR)

(*) Notice: Subject to any disclaimer, the term of this patent is extended or adjusted under 35 U.S.C. 154(b) by 354 days.

(21) Appl. No.: 12/602,108

(22) PCT Filed: May 31, 2007

(86) PCT No.: PCT/FR2007/000907
§ 371 (c)(1),
(2), (4) Date: Jan. 13, 2010

(87) PCT Pub. No.: WO2008/148943
PCT Pub. Date: Dec. 11, 2008

(65) Prior Publication Data
US 2010/0148510 A1 Jun. 17, 2010

(51) Int. Cl.
*F03B 13/12* (2006.01)
(52) U.S. Cl. .......................... 290/53; 290/42
(58) Field of Classification Search .............. 290/54, 290/43; 415/7; 416/84; 60/398, 497, 505; 405/76; 417/330
See application file for complete search history.

(56) References Cited

U.S. PATENT DOCUMENTS 4,206,601 A * 6/1980 Eberle .............................. 60/398
5,324,988 A * 6/1994 Newman ......................... 290/54

FOREIGN PATENT DOCUMENTS

| EP | 0 496 146 A1 | 7/1992 |
| FR | 2 834 757 A1 | 7/2003 |
| JP | 5-288141 A | 11/1993 |
| JP | 6-171577 A | 6/1994 |
| WO | WO 2005/005244 A1 | 1/2005 |
| WO | WO 2006/010783 A1 | 2/2006 |
| WO | WO 2006/105778 A1 | 10/2006 |

OTHER PUBLICATIONS

International Search Report, dated Apr. 23, 2008, from corresponding PCT application.

* cited by examiner

*Primary Examiner* — Tulsidas C Patel
*Assistant Examiner* — Viet Nguyen
(74) *Attorney, Agent, or Firm* — Young & Thompson

(57) ABSTRACT

A device (1) making it possible to convert the undulation and/or the oscillations of a liquid in which it is at least partially immersed into usable energy. The device (1) includes a float (3) guided by a guide device (2) anchored in the sea bed, with the aid of guide element (12) and including conversion element making it possible to convert the relative movements between the float (3) and the guide device (2) into usable energy such as electric energy.

20 Claims, 4 Drawing Sheets

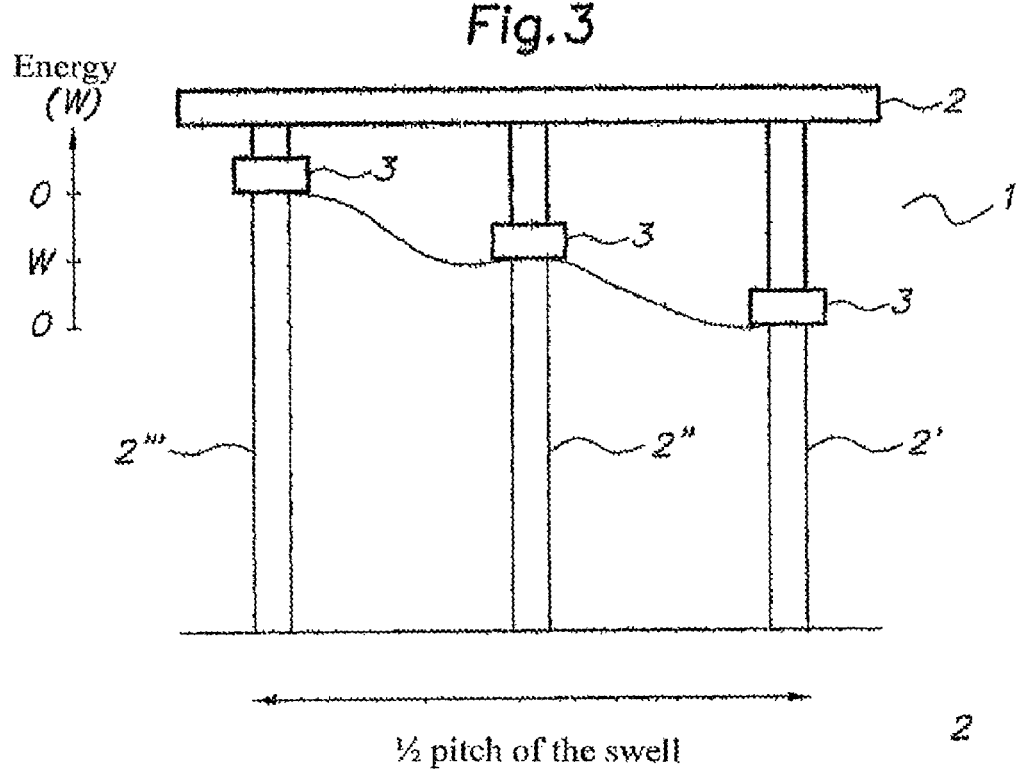
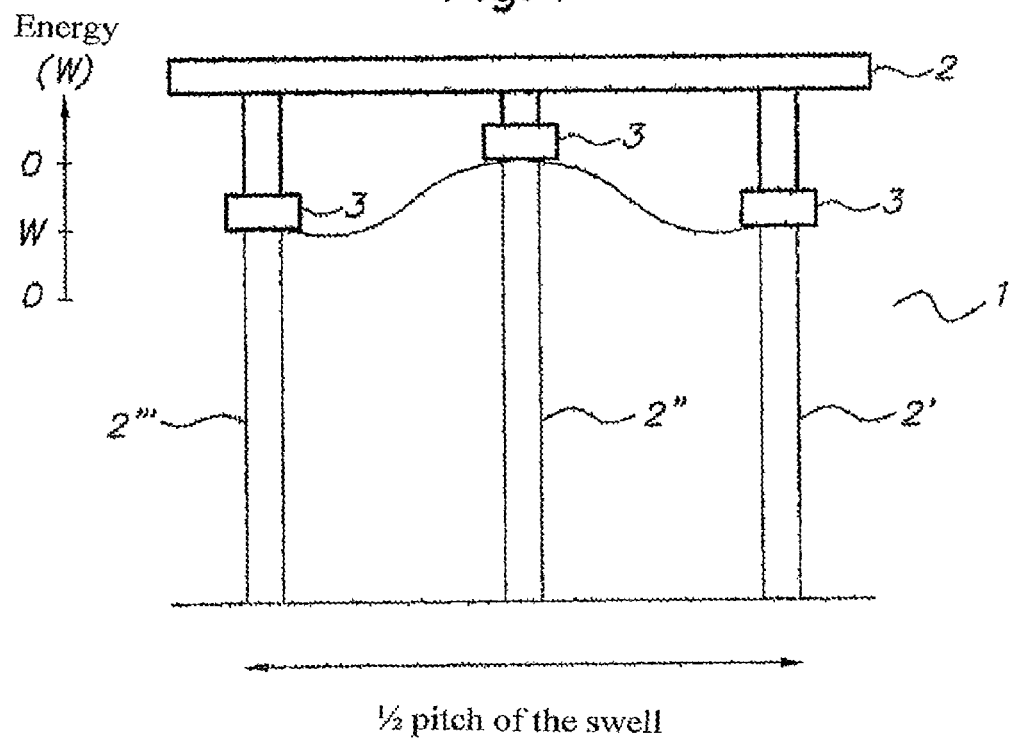

DEVICE FOR CONVERTING THE RIPPLE AND/OR THE OSCILLATIONS OF A LIQUID IN WHICH IT IS AT LEAST PARTLY IMMERSED, INTO USABLE ENERGY

BACKGROUND OF THE INVENTION

1. Field of the Invention

The object of the present invention is a device for converting the ripple and/or the oscillations of a liquid in which it is at least partly immersed, into usable energy. It notably, but not exclusively, applies to converting energy of the swell, of the waves and of the tide into electric energy.

2. Description of the Prior Art

It is known that there already exist devices for converting mechanical energy of the swell, the waves and of the tide into electric energy. Thus, notably, a device connected to the bottom of the sea through anchoring has already been proposed in patent FR 2 834 757, the latter device comprising at least one first flexible connecting member acting on a hydraulic actuator mounted in a hydraulic circuit including a hydraulic motor so that the action of the connecting member on the actuator during vertical displacements of the device, generates in the hydraulic circuit a flow rate and/or pressure change allowing said hydraulic motor to be driven into rotation. Also, a device is known from patent JP 5 288 141, in which floats each guided on a mast anchored in the sea bottom via rollers, actuate racks driving into rotation an electric current generator.

Nevertheless, these devices are relatively complex and generally comprise a relatively large number of parts such as for example valves, momentum wheels, cables, return pulleys, rack & pinion assemblies, which increases the problem of wear and corrosion and requires significant maintenance efforts.

OBJECT OF THE INVENTION

More particularly, the object of the invention is therefore to suppress these drawbacks. For this purpose, it proposes a device involving as in the example invoked earlier, a float guided by a guiding device anchored in the sea bed, with guiding means and including conversion means for converting the relative displacements between the float and the guiding device into usable energy such as electric energy for example.

SUMMARY OF THE INVENTION

According to the invention, the guiding means comprise at least one roller, pinion or wheel in contact with a rolling path of the guiding device, and the conversion means comprise at least one electric generator driven into rotation by said roller, said pinion or said wheel.

Advantageously, the roller, the pinion or the wheel may be mounted so as to rotate around an axis connected to the float.

By means of these arrangements, the sliding movement of the float subject to the swell drives a rotary movement of said roller, pinion or wheel which is connected to at least one generator which allows electric energy to be produced while limiting the kinematics linkage to the bare essentials.

According to an alternative embodiment of the invention, the devices comprises:

a substantially vertical guiding support directly or indirectly attached to a sea bed;
a float including:
 a through-hole with a substantially vertical axis, which opens out in its upper face and its lower face, the diameter of this hole being substantially larger than that of the guiding support in order to allow the float to slide relatively to said support;
 at least one compartment which comprises a front aperture opening out into said through-hole, a lower wall, an upper wall, a rear wall and two sidewalls each including an orifice with a horizontal axis facing each other; this compartment also comprises:
  at least one guiding means such as a roller, a pinion or a wheel, the horizontal axis of which is substantially parallel to the plane of said aperture, and positioned so as to be in contact with the surface of said guiding support when the latter is securely attached to the float;
  at least one driving shaft passing through the horizontal axis of said guiding means and crossing said orifices of said sidewalls, at least one of the ends of this driving shaft being connected to at least one generator comprised in the body of the float.

Thus, under the action of the swell and/or the waves and/or the tide and/or of buoyancy, the float performs an alternating vertical movement which drives the guiding means in contact with the surface of the guiding support. The alternating rotary movement of these guiding means is then transmitted to the driving shafts and then to the generator which may produce electric energy in this way.

Advantageously, in order to prevent the passing of the liquid into the body of the float, at least one of the faces of each sidewall of said compartments may comprise seal gaskets which may be O-rings, arranged to as to partly cover said orifices of these sidewalls and to clasp the driving shafts.

Advantageously, the device according to the invention may also comprise means for having the guiding means exert pressure on the surface of the guiding support in order to prevent untimely sliding of these guiding means.

Advantageously, the device according to the invention may comprise several generators which may each operate alternately in one direction and in the other.

The device according to the invention may also comprise:
 means for inverting the voltage generated by the generators according to the direction of rotation of said generators;
 means for converting the voltage generated by the generators into an AC or DC voltage;
 means for stabilizing and/or controlling the voltages generated by said generators.

Advantageously, the heat energy released by the generators during their operation may allow water to be heated, thereby making possible the recovery of energy as electricity but also as hot water.

BRIEF DESCRIPTION OF THE DRAWINGS

Embodiments of the invention will be described hereafter, as non-limiting examples, with reference to the appended drawings, wherein:

FIGS. 3, 4 and 5 are a schematic illustration of the movement of floats each sliding around a leg of a tripod guiding device.

DESCRIPTION OF THE PREFERRED EMBODIMENTS

In this example, the device according to the invention 1 comprises a guiding device formed by a guiding support 2 with a substantially vertical axis, attached to a sea bed or to a floating base (not shown) which is held in position by means of anchorings allowing it to remain fixed relatively to the sea bed.

Thus, the attachment of the guiding support 2 to the sea bed may notably be achieved by maintaining the floating base in position by means of substantially parallel permanently tensed anchoring lines.

The guiding support 2 may notably be cylindrical or with facets and is preferentially conformed so as not to oppose excessive resistance to the elements.

The device according to the invention 1 also comprises a float 3 including a through-hole 4, which substantially opens into the middle area of its upper face and of its lower face. In order to allow sliding of the float 3 relatively to said guiding support 2, the diameter of said hole 4 is substantially larger than that of the guiding support 2.

According to an alternative embodiment of the invention, the guiding support 2 may comprise several substantially vertical legs. Thus, as an example, it may be a tripod, three floats of the aforesaid type 3 which may each slide relatively to one of the three legs 2', 2", 2''' of the guiding support 2.

Figure 1:
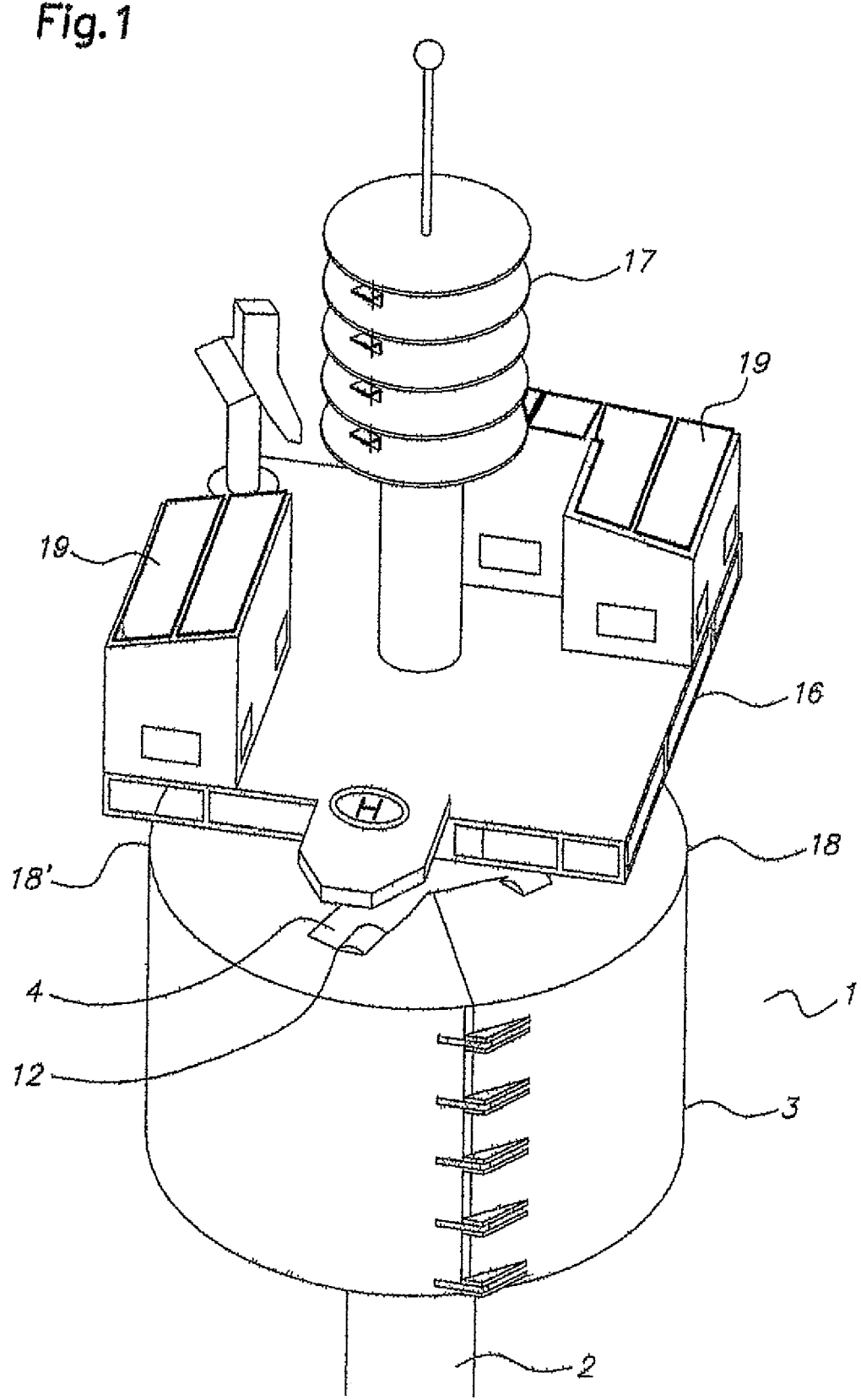
FIG. 1 is a schematic illustration of the device according to the invention overhung from an industrial platform.
Figure 2:
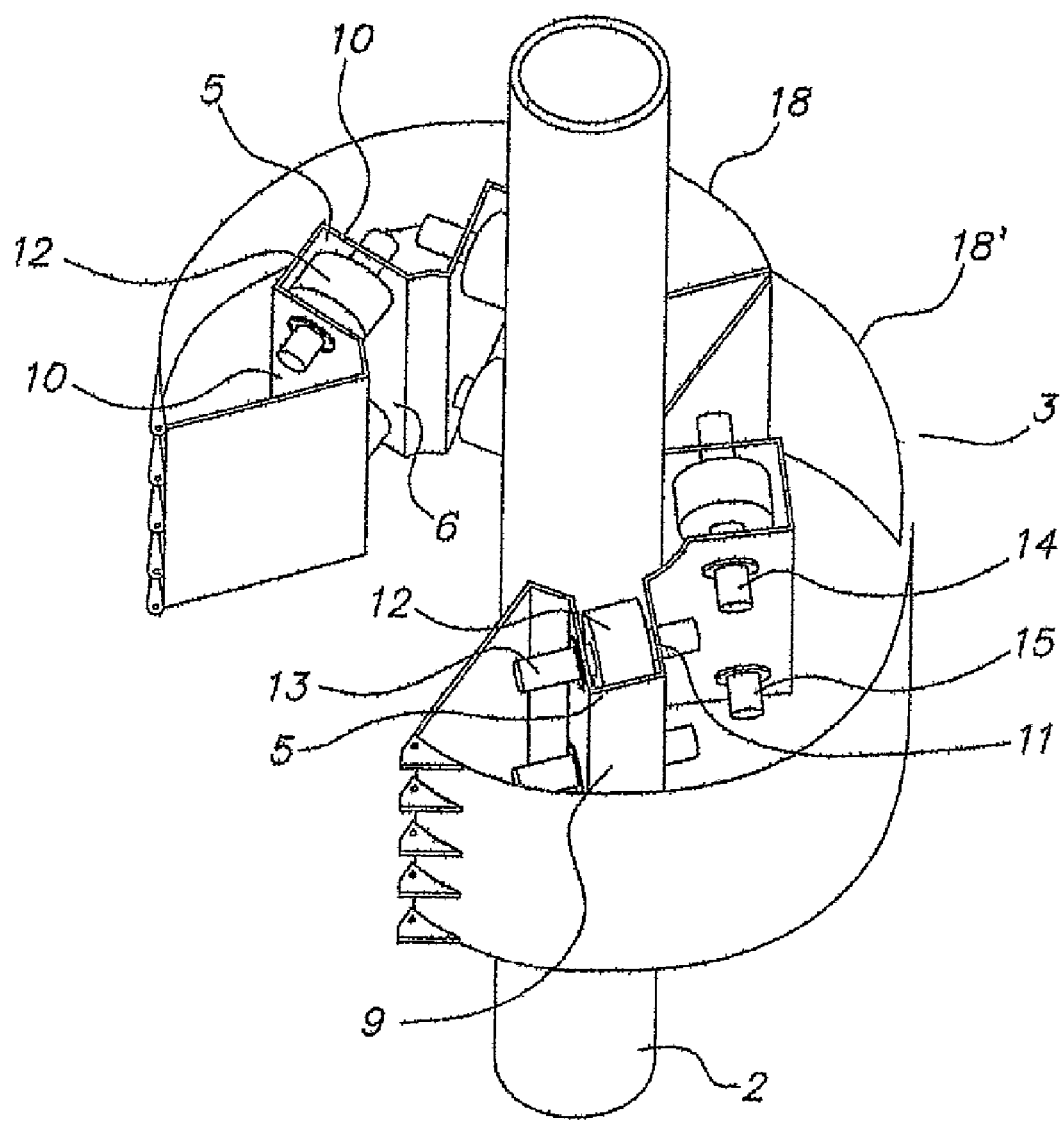
FIG. 2 is a schematic illustration of the guiding device and of the float of the device according to the invention in the disassembled position.

Advantageously, the structure and the shape of the float 3 are designed so as to ensure its floatability, so that its transport may be facilitated towards dry land in order to proceed with periodic inspections and/or to carry out repairs. Thus, as this is illustrated in FIG. 2, the float 3 may consist of two floating detachable shells 18, 18' which may be assembled and disassembled around a substantially vertical axis.

The float 3 may comprise four compartments 5 positioned at substantially regular intervals around said through-hole 4. Each of these compartments 5 includes a front aperture 6 opening into said through-hole 4, a lower wall, an upper wall, a rear wall 9 and two sidewalls 10 each including an orifice 11 with a horizontal axis, facing each other.

According to an alternative embodiment of the invention, the compartments 5 may be cylindrical, they then each include an aperture 6 opening into said through-hole 4, a lower wall, an upper wall and a sidewall 10, including two orifices 11 with a horizontal axis facing each other.

According to another alternative embodiment of the invention, each of said compartments 5 does not comprise any lower wall and any upper wall, they then form with said through-hole 4, a single through-hole which opens into the upper and lower face of the float 3. Thus, assuming that the float 3 comprises four compartments 5 positioned at regular intervals, the latter form with the through-hole 4 of the float 3, a single through-hole substantially having the shape of a cross.

Each compartment 5 also comprises:
- at least one guiding means 12, the horizontal axis of which is substantially parallel to the plane of said aperture 6, and positioned so as to be in contact with the surface of said guiding support 2 when the latter is securely attached to the float 3.
- at least one driving shaft 13 passing through the horizontal axis of said guiding means 12 and crossing said orifices 11 of said sidewalls 10. At least one of the ends of this driving shaft 13 being connected at least to one generator 14 comprised in the body of the float 3.

Said guiding means 12 may notably be a roller, a wheel or a pinion meshing with a rack (not shown) extending vertically on the surface of the guiding support 2.

Advantageously, in order to prevent water from passing into the body of the float 3, the latter may comprise seal gaskets which may be O-rings 15, which are positioned so as to partly cover said orifices 11 of said sidewalls 10 and to clasp said driving shafts 13.

Further, the device according to the invention 1 may also comprise means (not shown) allowing pressure of the guiding means 12 to be exerted on the surface of the guiding support 2 so as to prevent untimely sliding of these guiding means 12.

The generators 14 are DC or AC current generators, however according to an alternative embodiment of the invention, they may be replaced with hydraulic pumps (not shown).

Advantageously, the device according to the invention 1 may comprise several generators 14 which are preferably sealed and which may each operate alternately in one direction and in the other.

Advantageously, the heat energy released by the generators 14 during their operation may allow water to be heated making it thereby possible to recover energy as electricity but also as hot water.

In this way, under the action of the swell and/or the waves and/or the tide and/or of buoyancy, the float 3 performs an alternating vertical movement which drives the guiding means 12 in contact with the surface of the guiding support 2. The alternating rotary movement of these guiding means 12 is then transmitted to the driving shafts 13 and then to the generator 14 which may produce electric energy in this way.

Advantageously, with the alternating vertical movement of the float 3 it is possible to ensure automatic cleaning of the guiding support 2 and of the guiding means 12 by preventing attachment of elements such as shellfish and/or sediments.

Advantageously, the device according to the invention 1 may be overhung from an industrial platform 16 supported by the guiding support 2 and on which the thereby produced electric energy may be used for powering its industrial equipment. These platforms 16 may comprise at least one additional energy producing device such as a device for producing wind energy 17 and/or a device for producing heat energy (not shown) and/or a device for producing solar energy 19.

Devices according to the invention 1, either overhung or not from industrial platforms 16, may be grouped in relatively restricted spaces in order to form "swell-driven farms" or more generally "multi-energy farms".

The device according to claim 1 may comprise an electronic control device (not shown) for notably controlling:
- the generators 14 in real time and therefore for managing the production of energy depending on the needs;
- the float 3 in order to adapt the amplitude of its travel according to the tidal range and the movements of the swell; the amplitude of travel of the float 3 should be at least equal to the sum of the tidal range, of the amplitude of the swell and of a safety distance.

Advantageously, the float 3 may comprise at its base ballasting compartments (not shown), the filling of which may be controlled upon the announcement of a major storm, in order to allow its immersion and to thereby prevent it from being subject to excessive movements under the action of particularly strong swell; the filling and the emptying of said ballasting compartments may be controlled by said electronic control device.

Several devices according to the invention 1 may be grouped in a network and comprise an electronic control device of the aforesaid type for controlling:

the actuation and stopping of the sliding of the float 3 relatively to the guiding support 2;

as well as the resistance encountered by the guiding means 12 during their displacements on the surface of said guiding support 2.

In this way and advantageously, by this grouping of the devices of the invention 1 as a network, it is possible to ensure production of an average electric energy over time, actually, by means of a control device of the aforesaid type, a suitable phase shift of the travel of each of said floats 3 may be controlled, so as to get rid of the constraints related to the alternating movements of the swell.

The alternative embodiment of the invention according to which the guiding support 2 may comprise several substantially vertical legs, also making it possible to be rid of the alternating movements of the swell by means of a suitable phase shift of the different floats 3.

Figure 5:
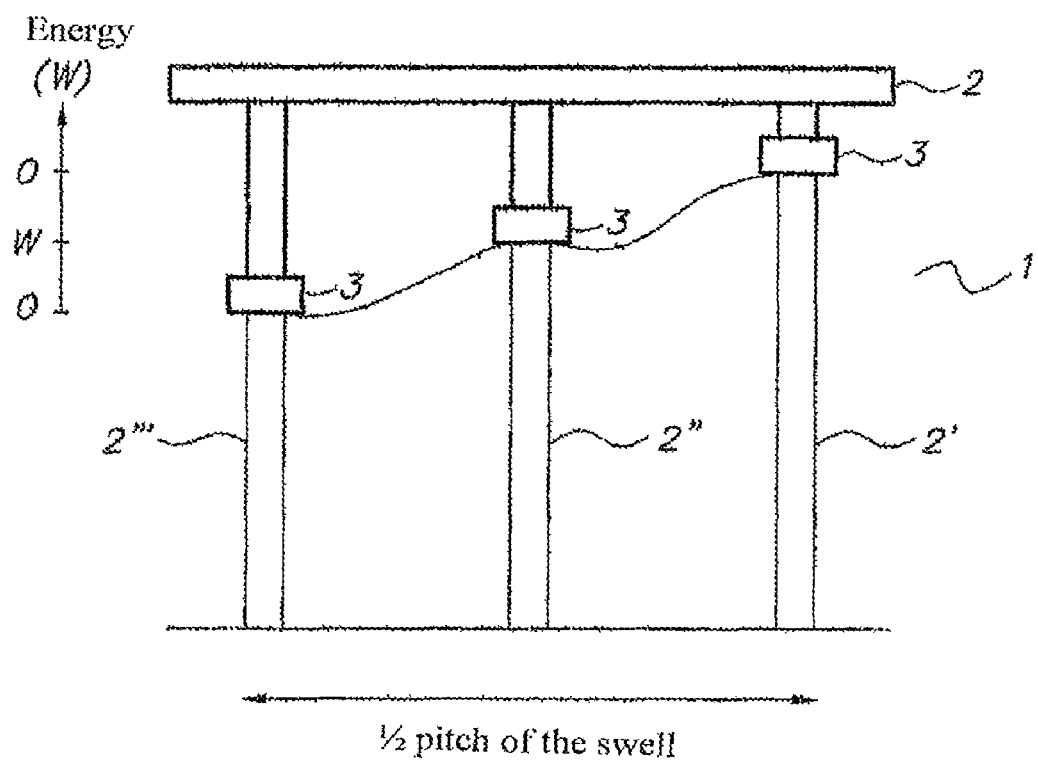

As an example, with the following assumptions:

as this is illustrated in FIGS. 3, 4 and 5, the guiding support 2 is a tripod, it comprises two side legs 2', 2''' and a middle leg 2" equidistant from these two other legs;

the distance between the two side legs 2', 2''' is substantially equal to one half swell pitch;

the device according to the invention 1 comprises a control device of the aforesaid type (not shown) which may control:

the actuation and stopping of the sliding of the floats 3 relatively to the guiding support 2;

as well as the resistance encountered by the guiding means 12 during their displacements on the surface of said guiding support 2.

FIG. 3 schematically illustrates the positioning of the different floats 3 at instant $t_0$. The floats 3 sliding around side legs 2', 2''' are respectively located on the top and in the trough of the wave, their respective velocity being zero at this instant, the energy which they produce is also zero. On the other hand, the float 3 sliding around the middle leg 2" is substantially located "in the middle" of the wave, and therefore produces non-zero energy equal to W. Therefore, at instant $t_0$, the device according to the invention 1 produces an energy having a value equal to W.

FIG. 4 schematically illustrates the positioning of the different floats 3 at instant $t_0+\frac{1}{4}$ pitch of the swell. The float 3 sliding around the middle leg 2" is located on the top of the wave, the energy which it produces is then zero. The floats 3 sliding around the side legs 2', 2''' as for them are substantially positioned "in the middle" of the wave and therefore each produce an energy equal to W. Therefore, at instant $t_0+\frac{1}{4}$ pitch of the swell, the device according to the invention 1 produces an energy with a value equal to 2 W.

FIG. 5 schematically illustrates the position of the different floats 3 at instant $t_0+\frac{1}{2}$ pitch of the swell. The floats 3 sliding around the side legs 2', 2''' are respectively located in the trough and at the top of the wave, their respective velocity being zero at this instant, the energy which they produce is also zero. On the other hand, the float 3 sliding around the middle leg 2" is substantially located "in the middle" of the wave and therefore produces non-zero energy equal to W. Therefore at instant $t_0+\frac{1}{2}$ pitch of the swell, the device according to the invention 1 produces an energy with a value equal to W.

In order to make the value of the energy produced by the device according to the invention 1, substantially constant, said control device may control the stopping of the sliding of one of the floats 3 sliding around the side legs 2', 2''' at instants $t_0+(k*\frac{1}{4})$ pitch of the swell (k being an odd natural integer different from 0). In this way, the energy (and therefore the voltage) produced by the device according to the invention 1 is constant (in the case in point, it is equal to W), said control device and guiding support 2 form means for stabilizing and/or regulating the voltages generated by said generators 14.

In order to convert the DC or AC voltage of the current produced by the generators 14 into an AC or DC voltage current respectively, the device according to the invention 1 may also comprise means for converting the DC or AC voltage generated by the generators 14 into an AC or DC voltage respectively, such as voltage converters (not shown), for example allowing transformation of a 650 V DC current into a three-phase 380 V AC current directly usable in proximity to the device according to the invention 1, such as for example on an industrial platform 16 overhanging it. Advantageously, the device according to the invention may comprise a "bus drive" (not shown) allowing addition of all the energies of each generator 14 and thereby allowing a 750 V AC current produced by the generators to be transformed into a 650 V DC current.

The invention claimed is:

1. A device, comprising:
a float comprised of first and second floating shells pivotably attached to one another at a first end and releasably attachable to one another at an opposite second end;
a vertical guiding device anchored in the sea bed with guiding means, the first and second floating shells of the float releasably attached to one another so as to encircle the guiding device within an axial opening extending between the two shells; and
conversion means for converting relative displacements between the float and the guiding device into usable energy,
wherein:
the guiding device comprises at least two opposite rolling paths;
the guiding means comprise at least two wheels or rollers mounted so as to rotate around two respective axes of rotation securely attached to said float and radially mobile relatively to the guiding device, both of these wheels or rollers being positioned so as to be able to respectively roll on said rolling paths;
the conversion means comprise means for converting the rotary movement of the wheels or rollers into usable energy;
the float comprises means allowing the wheels or the rollers to exert an antagonistic pressure on the rolling paths, so that with said wheels or said rollers it is possible to both ensure:
guiding of the float on the guiding device;
and their driving into rotation during displacements of said float.

2. The device according to claim 1, wherein the guiding means comprise at least one roller, one pinion or one wheel in contact with a rolling path of the guiding device, and the conversion means comprise at least one electric generator or hydraulic pump driven into rotation by said roller, said pinion or said wheel.

3. The device according to claim 2, wherein the roller, the pinion or the wheel is mounted so as to rotate around an axis connected to the float.

4. The device according to claim 3, further comprising:
a substantially vertical guiding support directly or indirectly attached to a sea bed;
a float including:
a through-hole, with a substantially vertical axis, which opens out in its upper face and its lower face, the diameter of this hole being substantially larger than the one of the guiding support in order to allow the float to slide relatively to said support;

at least one compartment which comprises a front aperture opening out into said through-hole, a rear wall, and two sidewalls each including an orifice with a horizontal axis facing each other; or said compartments are cylindrical, the sidewall of which including two orifices with a horizontal axis facing each other; said compartment also comprising:

at least one guiding means such as a roller, or a wheel, the horizontal axis of which is substantially parallel to the plane of said aperture, and positioned so as to be in contact with the surface of said guiding support when the latter is securely attached to the float;

at least one driving shaft passing through the horizontal axis of said guiding means and crossing said orifices of said sidewalls, at least one of the ends of this driving shaft being connected to at least one generator comprised in the body of the float.

5. The device according to claim 4, wherein the guiding device is attached to a floating base which is held in position by means of substantially parallel and permanently tensed anchoring lines allowing it to remain fixed relatively to the sea bed.

6. The device according to claim 4, wherein the guiding support is cylindrical or with facets and is conformed in order not to oppose excessive resistance to the elements.

7. The device according to claim 4, wherein the guiding support—comprises several substantially vertical legs, a float sliding relatively to each of its legs.

8. The device according to claim 4, wherein the body of the float comprises O-ring seal gaskets which are positioned so as to partly cover said orifices of said sidewalls and to clasp said driving shafts.

9. The device according to claim 4, wherein the generator(s) is (are) sealed and operate(s) alternately in one direction or in the other.

10. The device according to claim 4, wherein the generators form a means for producing heat energy, this heat energy released by the generators during their operation allowing water to be heated.

11. The device according to claim 4 being overhung from an industrial platform supported by the guiding support and on which the thereby produced electric energy may be used for powering its industrial equipment.

12. The device according to claim 11, wherein the platforms comprise a device for producing wind energy and/or a device for producing heat energy and/or a device for producing solar energy.

13. The device according to claim 4, wherein the devices according to the invention are grouped as a network.

14. The device according to claim 4 comprising an electric control device for controlling:

the generators in real time and therefore for managing energy production depending on the needs.

15. The device according to claim 4, wherein the float comprises ballasting compartments at its base.

16. The device—according to claim 15, wherein the filling and emptying of said ballasting compartments are controlled by said electronic control device.

17. The device according to claim 15, wherein the filling and emptying of said ballasting compartments are controlled by said electronic control device.

18. The device according to claim 4 comprising means for converting the DC or AC voltage generated by the generators into an AC or DC voltage, respectively.

19. The device according to claim 4, comprising a bus drive for adding the energies of each generator.

20. The device according to claim 4, wherein each of said compartment comprises a lower wall and an upper wall.

* * * * *